3,696,015
PROCESS FOR REDUCING THE CONCENTRATION OF 2 - DICHLOROBUTADIENE-(1,3) IN 1,2-DICHLOROETHANE RECOVERED IN THE INCOMPLETE THERMAL CRACKING INTO VINYL CHLORIDE
Peter Wirtz, Cologne-Lindenthal, Armin Jacobowsky, Knapsack, near Cologne, Werner Mittler, Hermulheim, near Cologne, and Wilfried Gerhardt, Knapsack, near Cologne, Germany, assignors to Knapsack Aktiengesellschaft, Knapsack, near Cologne, Germany
Filed Nov. 18, 1970, Ser. No. 90,716
Claims priority, application Germany, Nov. 26, 1969, P 19 59 211.1
Int. Cl. B01j 1/10
U.S. Cl. 204—163 R                               3 Claims

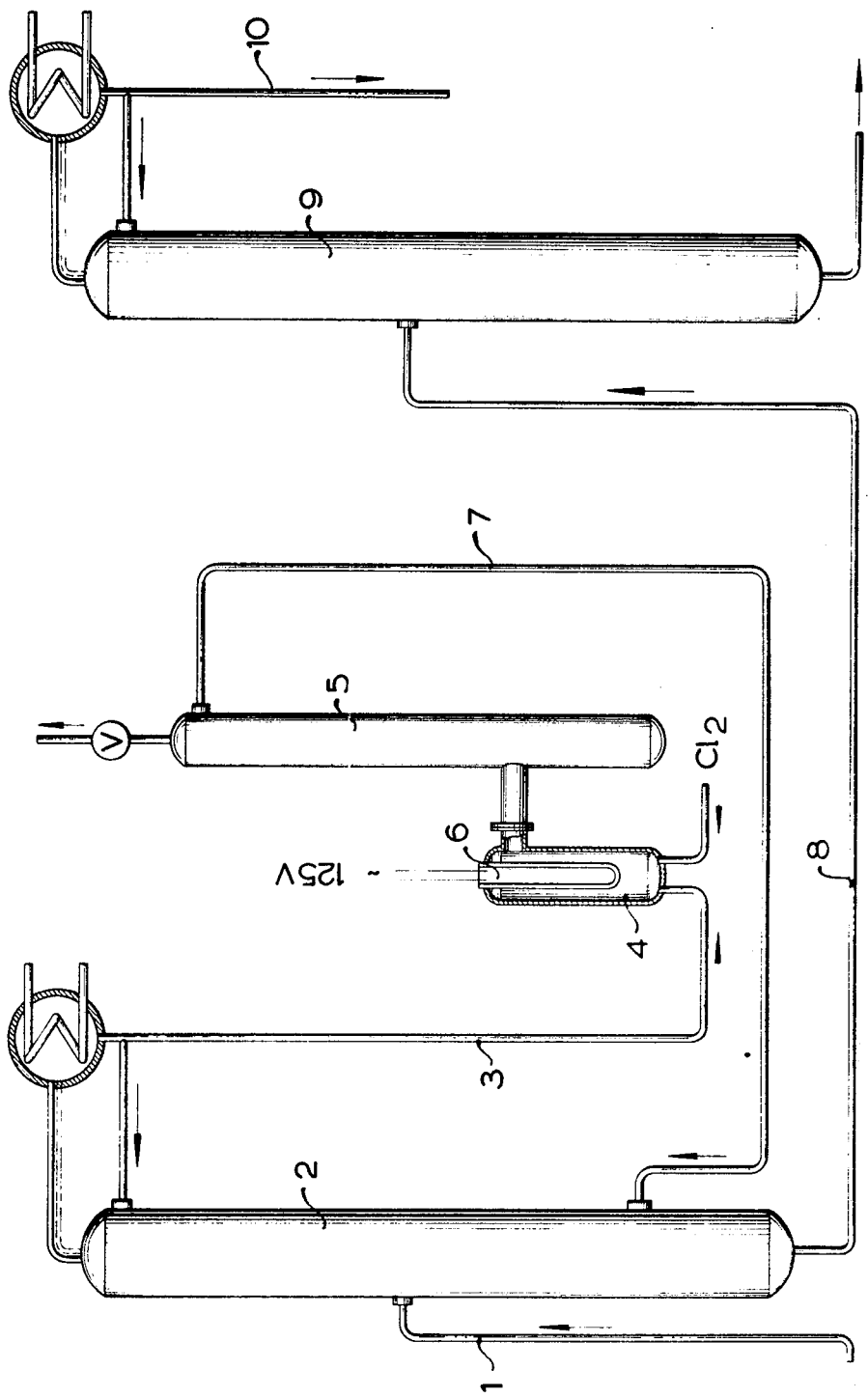

ABSTRACT OF THE DISCLOSURE

The concentration of 2-chlorobutadiene-(1,3) in 1,2-dichloroethane recovered in the incomplete thermal cracking of 1,2-dichloroethane into vinyl chloride and being contaminated with low boilers boiling at a temperature lower than 83.7° C. (760 mm. Hg) and high boilers boiling at a temperature higher than 83.7° C. (760 mm. Hg), is reduced by transforming the 2-chlorobutadiene-(1,3) low boiler into a high boiler contaminant. To this end, the 1,2-dichloroethane is distillatively freed from its low boiler contaminants in a low boiler column; all or a portion of the low boiler contaminants concentrating near the head of the low boiler column is continuously withdrawn therefrom; the low boiler concentrate withdrawn from the low boiler column is treated with gaseous chlorine at temperatures of between 10 and 120° C., under pressures of between 1 and 3 atmospheres absolute, with irradiation of ultraviolet and/or visible light in the absence of catalysts, and the chlorine-treated low boiler concentrate recycled to the said low boiler column; material accumulating in the base of the said low boiler column is continuously delivered from the low boiler column to a high boiler column; and pure dichloroethane is distilled off from the high boiler contaminants in the high boiler column.

---

Modern commercial vinyl chloride production is based on a plurality of reaction steps, namely the catalytic chlorination of ethylene to 1,2-dichloroethane and thermal cracking thereof into vinyl chloride and hydrogen chloride. This latter compound can be subjected to oxychlorination using oxygen and ethylene and used again for the synthesis of dichloroethane, or it can be catalytically reacted with acetylene for the production of vinyl chloride.

The conversion rates obtained in the thermal cracking of dichloroethane are substantially a function of the temperature used and reach a value of between 45 and 65% at temperatures of between 530° C. and 560° C. The unreacted 1,2-dichloroethane balance portion (B.P.$_{760}$=83.7° C.) is distillatively freed from hydrogen chloride, vinyl chloride (B.P.$_{760}$=−13.9° C.) and high boilers (B.P.$_{760}$=>83.7° C.), and then cracked again, together with the low boilers (B.P.$_{760}$=<83.7° C.). Attempts have already been made in industry to produce fairly high conversion rates, for reasons of economy. It has been found, however, that increased conversion rates entail the formation of increasing quantities of secondary cracking products, particularly 2-chlorobutadiene-(1,3). Further by-products are butadiene-(1,3), 1,1-dichloroethylene, 1,1-dichloroethane, chloroform, trichloroethylene, ethyl chloride, carbon tetrachloride, and benzene. The fact that 2-chlorobutadiene-(1,3) increasingly concentrates in the cycled 1,2-dichloroethane produces two adverse effects. Firstly coking inside the cracking coil occurs more rapidly than with the use of pure 1,2-dichloroethane therein, and produces a pressure increase. It is accordingly necessary for the cracking coil to be cleaned in shorter intervals, and this in turn reduces the plant capacity. Secondly, the vinyl chloride contaminants, particularly butadiene-(1,3), are found to increase. Subjecting vinyl chloride to distillative treatment to isolate the butadiene-(1,3) therefrom is a procedure that dictates the use of very costly distilling apparatus.

Various processes for the removal of secondary cracking products from unreacted 1,2-dichloroethane have already been described. British specification 938,824, for example, discloses a process wherein the cracking products consisting of vinyl chloride, hydrogen chloride, unreacted 1,2-dichloroethane and the secondary products are quenched; hydrogen chloride and vinyl chloride are distillatively isolated therefrom and the low boilers—necessarily in admixture with a portion of unreacted 1,2-dichloroethane—are distilled off near the head of a so-called low-boiler column, and discarded; and the bulk of the unreacted 1,2-dichloroethane is treated in a high boiler column and distillatively freed therein from the high boilers, and recycled then to the cracking coil to undergo further cracking therein. A disadvantage inherent to this process resides in the fact that the removal of the low boilers from the dichloroethane cycle—this to avoid polymerization of 2-chlorobutadiene-(1,3) at the head of the low boiler column—can be effected only at the price of relatively heavy loss of dichloroethane.

The process described in Belgian Pat. 719,865 is based on the chemical separation of the by-products. Following the distillative isolation of hydrogen chloride and vinyl chloride, the unreacted 1,2-dichloroethane is introduced, without prior isolation of low boilers, into the high boiler column and distilled 1,2-dichloroethane is subjected portionwise and batchwise to a Friedel-Crafts' synthesis, with addition of AlCl$_3$. This effects reaction between the unsaturated aliphatic hydrocarbons, e.g. 2-chlorobutadiene-(1,3), and benzene with the resultant formation of higher-boiling alkylarylhalides, from which 1,2-dichloroethane can be isolated distillatively.

A still further process for the removal of trichloroethylene from 1,2-dichloroethane coupled with the production of corresponding quantities of pentachloroethane has been described in German published Specification (Offenlegungsschrift) 1,815,336, wherein the dichloroethane, which may be loaded with water, is treated with chlorine under irradiation with visible and/or ultraviolet light. However, the contaminated 1,2-dichloroethane treated in this process is initially free from 2-chlorobutadiene-(1,3) and merely contains chloroform, benzene, trichloroethylene and possibly 1,1,2-trichloroethane contaminants. While the irradiation effects a reduction in the concentration of trichloroethylene, the fact remains that it simultaneously effects an increase in the concentration of chloroform, benzene, and 1,1,2-trichloroethane in 1,2-dichloroethane. The above specification also does not teach how to carry out the process described therein, in the treatment of 1,2-dichloroethane, such as that recovered upon the incomplete thermal cracking of 1,2-dichloroethane into vinyl chloride and hydrogen chloride.

The present invention now provides a process for reducing the concentration of 2-chlorobutadiene-(1,3) in 1,2-dichloroethane, the 1,2-dichloroethane having been recovered in the incomplete thermal cracking of 1,2-dichloroethane into vinyl chloride and being contaminated with low boilers boiling at a temperature lower than 83.7° C. (760 mm. Hg) and high boilers boiling at a temperature higher than 83.7° C. (760 mm. Hg), which comprises transforming the 2-chlorobutadiene-(1,3) low boiler into a high boiler contaminant by distillatively freeing the 1,2-dichloroethane from the low boiler contaminants therein, in a low boiler column; continuously withdrawing all or a portion of the low boiler contaminants concentrating near the head of the said low boiler column; treating the low boiler concentrate withdrawn from the said low boiler column with gaseous chlorine at temperatures of between 10 and 120° C., preferably between 30 and 85° C., under pressures of between 1 and 3 atmospheres absolute, with irradiation of ultraviolet and/or visible light in the absence of catalysts, and recycling the chlorine-treated low boiler concentrate to the said low boiler column; continuously delivering material accumulating in the base of the said low boiler column from said low boiler column to a high boiler column; and distilling off pure dichloroethane from the high boiler contaminants in the said high boiler column.

The irradiation is preferably carried out with the use of a source of ultraviolet light, consuming between 1 and 300 watt-hours per kg. chlorine.

As compared with the overall elimination of the low boilers in the low boiler column, the process of the present invention enables 2-chlorobutadiene-(1,3) to be removed without any loss of dichloroethane, which is advantageous. The present process also offers an advantage over the discontinuous transformation of the low boilers, particularly 2-chlorobutadiene-(1,3) and benzene, into high boilers, which resides in the fact that the concentrated secondary cracking products are continuously chlorinated with irradiation of light. As a result thereof, 2-chlorobutadiene-(1,3) is substantially completely transformed into a high boiler contaminant, and the butadiene concentration in vinyl chloride is reduced from initially 80 to 100 parts per million (p.p.m.) down to 3 to 25 p.p.m., under otherwise identical conditions. The rate or velocity of coking in the cracking coil can be lowered by at least 50%.

While low dichloroethane conversion rates enable a cracking coil to be operated for a period as long as 6 to 8 weeks, the fact remains that high conversion rates normally limit the operation therein to a few days. In clear contrast with this, it is made possible by the process of the present invention to operate a cracking coil for as long a period as 6 to 8 weeks, and this despite high conversion rates.

As will be shown in the working example hereinafter, the steps used in accordance with the present invention effect the substantially complete elimination of 2-chlorobutadiene-(1,3) from the concentrated low boilers. As a result of the extensive elimination of 2-chlorobutadiene-(1,3) by transforming it into a high boiler contaminant— fresh proportions of 2-chlorobutadiene-(1,3) are continuously produced in the process—and the combination, following chlorination under light, of the low boiler concentrate with the bulk of recovered 1,2- dichloroethane, the overall quantity of dichoroethane, which is distilled off from the high boiler contaminants and recycled to the high boiler column, contains 2-chlorobutadiene-(1,3) in a maximum concentration of 500 p.p.m.

The process of the present invention has incidentally been found to also reduce the concentration of various further low boiler contaminants, for example benzene, in 1,2-dichloroethane.

The invention will now be described in greater detail in the following working example with reference to the accompanying drawing.

EXAMPLE

A reactor for the thermal cracking of 1,2-dichloroethane was fed, per hour, with 11.2 cubic meters (=14 metric tons) of dichloroethane, of which 60 percent was cracked. The unreacted balance portion (5.6 metric tons) of contaminated 1,2-dichloroethane was distillatively freed from hydrogen chloride and vinyl chloride and introduced through conduit 1 into a so-called low boiler column 2. By-products formed during the cracking of 1,2-dichloroethane and boiling at a temperature lower than 1,2-dichloroethane were found to concentrate near the head of column 2. They were condensed and a portion thereof was refluxed to column 2.

The balance portion of the low boiler concentrate was introduced through conduit 3 into a chlorinator at an hourly rate of 200 liters=244 kg./hr. The chlorinator comprised a true reaction zone 4 and a post-reaction zone 5. Reaction zone 4, which had a tubular shape (1 meter high and 200 millimeters wide) was fitted with a mercury high pressure lamp 6. Lamp 6 had a length of 346 mm., a diameter of 23 mm., a visible arc length of 180 mm., and the following characteristic data:

voltage of burner—125 volt
current intensity—4.8 ampere
power—600 watt
radiation components—238–280 millimicrons 19.2%, 289–579 millimicrons 80.8%

Post reaction zone 5 also has a tubular shape (3 meters high and 200 millimeters wide) and was fitted with a vent pipe at its upper end.

6 kg./hr. of chlorine were introduced at 50° C., downstream of lamp 6. The mean pressure prevailing in reaction zone 4 was 0.3 atmosphere gauge. 250 kg./hr. of 1,2-dichloroethane mixture left the chlorinator through post-reaction zone 5. The quantitative and qualitative composition which the 1,2-dichloroethane mixture (low boiler concentrate) had ahead and downstream of the chlorinator is indicated in the following table:

| | B.P., °C. | In conduit 3, weight percent | In conduit 7, weight percent |
|---|---|---|---|
| 1,2-dichloroethane | 83.7 | 84.2 | 82.0 |
| Vinyl chloride | 13.9 | 0.72 | 0.41 |
| Ethyl chloride | 13.1 | 1.7 | 1.5 |
| 1,1-dichloroethylene | 37 | 0.21 | 0.17 |
| 1,2-dichloroethylene (trans) | 48.4 | 0.05 | 0.01 |
| 2,chlorobutadiene-(1,3) | 59.4 | 2.4 | 0.23 |
| 1,1-dichloroethane | 57.3 | 2.1 | 2.1 |
| Carbon tetrachloride | 76.8 | 0.38 | 0.002 |
| 1,1,1-trichloroethane | 74.1 | 0.21 | 0.002 |
| 1,2-dichloroethylene (cis) | 60.3 | 0.03 | 0.03 |
| Benzene | 80.1 | 7.7 | 7.5 |
| Chloroform | 61.2 | 0.08 | 0.08 |
| Trichloroethylene | ¹ 82.2 | 0.10 | 0.10 |
| High boilers | >83.7 | | 5.7 |

¹ Azeotrope.

Effluent coming from the chlorinator and extensively freed from 2-chlorobutadiene-(1,3) was recycled through conduit 7 to low boiler column 2. The high boilers were delivered to low boiler column 2, namely its base, which also contained the high boilers originating from the cracking, and delivered further through conduit 8 to high column 9 downstream of column 2, and removed at the bottom of column 9. Purified 1,2-dichloroethane was recycled from the head of high boiler column 9 and through conduit 10 to the cracking zone.

The elimination of low boilers is rendered unnecessary thanks to the chlorination of a portion of low boilers to high boilers. To remove the low boilers, it would be necessary for them to be very highly concentrated by costly and unreliable steps.

By the chlorination of the low boilers with the use of a mercury high pressure pump, it is made possible to maintain so low a concentration of 2-chlorobutadiene-(1,3) in the 1,2-dichloroethane to undergo cracking that adverse effects during the cracking are not likely to occur.

6 kg. (85 mols) of chlorine were consumed per hour, of which 60 mols were needed for reaction with 2-chlorobutadiene-(1,3). Altogether as little as 1 mol of chlorine was required to be used per mol of reacted low boiler. The irradiation was effected at the rate of 100 watt-hours per kg. of chlorine.

We claim:
1. A process for reducing the concentration of 2-chlorobutadiene-(1,3) in 1,2-dichloroethane, the 1,2-dichloroethane having been recovered in the incomplete thermal cracking of 1,2-dichloroethane into vinyl chloride and being contaminated with low boilers boiling at a temperature lower than 83.7° C. (760 mm. Hg) and high boilers boiling at a temperature higher than 83.7° C. (760 mm. Hg), which comprises transforming the 2-chlorobutadiene-(1,3) low boiler into a high boiler contaminant by distillatively freeing the 1,2-dichloroethane from the low boiler contaminants therein in a low boiler column; continuously withdrawing all or a portion of the low boiler contaminants concentrating near the head of said low boiler column; treating the low boiler concentrate withdrawn from the said low boiler column with gaseous chlorine at temperatures of between 10 and 120° C., under pressures of between 1 and 3 atmospheres absolute, with irradiation of ultraviolet and/or visible light in the absence of catalysts, and recycling the chlorine-treated low boiler concentrate to the said low boiler column; continuously delivering material accumulating in the base of the said low boiler column from said low boiler column to a high boiler column; and distilling off pure dichloroethane from the high boiler contaminants in the said high boiler column.

2. The process as claimed in claim 1, wherein the concentrate of low boiler contaminants is treated with gaseous chlorine at temperatures of between 30 and 85° C.

3. The process as claimed in claim 1, wherein the irradiation is effected with the use of a source of ultraviolet light consuming between 1 and 300 watt-hours per kg. of chlorine.

References Cited
FOREIGN PATENTS 938,824 10/1963 Great Britain ____ 204—163 R X
1,475,289 2/1967 France _____ 204—163 R BENJAMIN R. PADGETT, Primary Examiner